US010663302B1

(12) United States Patent
Shen

(10) Patent No.: US 10,663,302 B1
(45) Date of Patent: May 26, 2020

(54) AUGMENTED REALITY NAVIGATION

(71) Applicant: Capital One Services, LLC, McLean, VA (US)

(72) Inventor: Chen Shen, Albany, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/356,526

(22) Filed: Mar. 18, 2019

(51) Int. Cl.
*G01C 21/20* (2006.01)
*G06T 11/60* (2006.01)

(52) U.S. Cl.
CPC ............ *G01C 21/206* (2013.01); *G06T 11/60* (2013.01)

(58) Field of Classification Search
CPC ...... G01C 21/206; G06T 11/60; G06T 19/006
See application file for complete search history.

(56) References Cited

U.S. PATENT DOCUMENTS

| 9,304,003 | B1* | 4/2016 | Ashman | G01C 21/206 |
| 2012/0249588 | A1* | 10/2012 | Tison | G06F 1/1696 345/633 |
| 2013/0024116 | A1* | 1/2013 | Kitatani | H04W 4/029 701/521 |
| 2014/0321698 | A1* | 10/2014 | Chao | G06T 7/20 382/103 |
| 2016/0140868 | A1* | 5/2016 | Lovett | G09B 19/0053 434/118 |
| 2017/0006429 | A1* | 1/2017 | Douglas et al. | H04W 40/20 |
| 2017/0193705 | A1* | 7/2017 | Mullins | G06T 19/006 |
| 2018/0308063 | A1* | 10/2018 | Jan | G06Q 10/1091 |
| 2019/0322212 | A1* | 10/2019 | Kastner et al. | B60Q 3/80 |

FOREIGN PATENT DOCUMENTS

WO WO-2017134111 A1 * 8/2017 ......... G01C 21/3661

OTHER PUBLICATIONS

Yuanchao Shu and Börje Karlsson, Path Guide: A New Approach to Indoor Navigation, Jul. 14, 2017, Microsoft Research Blog, pp. 1-8. (Year: 2017).*
Devin Coldewey, Microsoft's Path Guide is an unconventional approach to indoor navigation, Jul. 14, 2017, TechCrunch, pp. 1-8. (Year: 2017).*

* cited by examiner

*Primary Examiner* — Jeffery A Brier
(74) *Attorney, Agent, or Firm* — DLA Piper LLP US

(57) ABSTRACT

A processor of an AR device may receive a plurality of points within a coordinate system corresponding to points in space. The plurality of points may define a path between a starting location within the coordinate system and a navigation destination within the coordinate system. The processor may determine that the AR device is at the starting location. The processor may receive camera data from a camera of the AR device. The camera data may represent at least a portion of the points in space. The processor may generate an AR display. The generating may include overlaying a graphic illustrating the position of at least a portion of the points within the coordinate system over equivalent points in space illustrated by the camera data.

17 Claims, 10 Drawing Sheets

AUGMENTED REALITY NAVIGATION

BACKGROUND

Navigation systems and methods are available for a variety of travel types. For example, users can obtain directions between locations that may be based on geolocation (e.g., global positioning system (GPS)) data and/or predetermined maps. A user may be able to enter a destination and obtain directions from their location to the destination, typically overlaid on a map, with their own location determined by geolocation. For example, a user can get walking, bicycling, driving, and transit directions from a starting point to an end point, and these directions may differ depending on the type of transportation used.

SUMMARY OF THE DISCLOSURE

Some embodiments disclosed herein may include a method of providing an augmented reality (AR) display. The method may include receiving, at a processor of an AR device, a plurality of points within a coordinate system corresponding to points in space. The plurality of points may define a path between a starting location within the coordinate system and a navigation destination within the coordinate system. The method may include determining, by the processor, that the AR device is at the starting location. The method may include receiving, at the processor, camera data from a camera of the AR device. The camera data may represent at least a portion of the points in space. The method may include generating, by the processor, an AR display. The generating may include overlaying a graphic illustrating the position of at least a portion of the points within the coordinate system over equivalent points in space illustrated by the camera data.

In some embodiments, the determining that the AR device is at the starting location may include receiving a scan of an object at the starting location from the camera.

In some embodiments, the determining that the AR device is at the starting location may include gathering location data defining a position of the AR device with at least one sensor of the AR device and comparing the location data with location data defining the starting location.

In some embodiments, the generating may include changing the graphic to illustrate the position of a different portion of the points within the coordinate system as the AR device moves along equivalent different points in space illustrated by the camera data.

In some embodiments, the method may include generating, by the processor, a map display illustrating the points within the coordinate system overlaid on a map.

In some embodiments, the method may include generating, by the processor, a search request identifying the starting location and the navigation destination. The method may include transmitting, by the processor, the search request. The receiving may include receiving the plurality of points from a server in response to the search request.

Some embodiments disclosed herein may include a method of generating augmented reality (AR) display data. The method may include setting, by a processor of an AR device, a location of the AR device as a starting location within a coordinate system corresponding to points in space. The method may include, as the AR device moves through space from the starting location, repeatedly recording, by the processor, locations of the AR device as points within the coordinate system. The method may include determining, by the processor, that the AR device has reached a destination location within the coordinate system. The method may include, in response to the determining, generating, by the processor, a route definition comprising at least the starting location within the coordinate system, the points within the coordinate system, and the destination location within the coordinate system.

In some embodiments, the setting of the location as the starting location may include receiving a scan of an object at the starting location.

In some embodiments, the method may include transmitting, by the processor, the route definition to a server configured to serve AR display data.

In some embodiments, the method may include generating, by the processor, an AR display. The generating may include overlaying a graphic illustrating the position of at least a portion of the points within the coordinate system over equivalent points in space illustrated by camera data gathered by a camera of the AR device.

In some embodiments, the determining that the AR device has reached a destination location may be performed in response to a user command.

In some embodiments, the determining that the AR device has reached a destination location may be performed in response to receiving a scan of an object at the destination location.

Some embodiments disclosed herein may include an augmented reality (AR) device. The device may include a processor, a camera in communication with the processor, a display in communication with the processor, and a non-transitory memory in communication with the processor. The non-transitory memory may store instructions that, when executed by the processor, cause the processor to perform processing. The processing may include receiving a plurality of points within a coordinate system corresponding to points in space. The plurality of points may define a path between a starting location within the coordinate system and a navigation destination within the coordinate system. The processing may include determining that the AR device is at the starting location. The processing may include receiving, by the camera, camera data representing at least a portion of the points in space. The processing may include displaying, by the display, an overlay of a graphic illustrating the position of at least a portion of the points within the coordinate system over equivalent points in space illustrated by the camera data.

In some embodiments, the processing may include setting a location of the AR device as the starting location within the coordinate system. The processing may include, as the AR device moves through space from the starting location, repeatedly recording locations of the AR device as points within the coordinate system. The processing may include determining that the AR device has reached the destination location within the coordinate system. The processing may include, in response to the determining, generating a route definition comprising at least the starting location within the coordinate system, the points within the coordinate system, and the destination location within the coordinate system.

In some embodiments, the received plurality of points may include the route definition.

In some embodiments, the device may include a transceiver configured to transmit the route definition to a server configured to serve AR display data.

In some embodiments, the device may include at least one location sensor configured to determine the AR device is at the starting location.

In some embodiments, the device may include a transceiver configured to receive the plurality of points from a server configured to serve AR display data.

In some embodiments, the displaying may include changing the graphic to illustrate the position of a different portion of the points within the coordinate system as the AR device moves along equivalent different points in space illustrated by the camera data.

In some embodiments, the processing may include displaying, by the display, a map display illustrating the points within the coordinate system overlaid on a map.

DETAILED DESCRIPTION OF SEVERAL EMBODIMENTS

Embodiments disclosed herein may provide systems and methods for generating navigation instructions with a portable user device and/or displaying navigation instructions with a portable user device. In some embodiments, the disclosed systems and methods may enable users to generate and/or use navigation instructions for areas that may be difficult to navigate using geolocation, such as interior spaces and/or other close quarters where specific and precise directions are useful. For example, some embodiments may provide navigation routes for hallways and/or rooms within buildings, including buildings that may have multiple stories with different floor layouts. Some embodiments may enable users to create navigation routes by defining a starting point, walking the route with the user device, and defining a destination point when the destination is reached. These routes may be shared with other devices, for example enabling other users to start from similar starting points and reach similar destination points using similar routes. In some embodiments, the disclosed systems and methods may provide augmented reality (AR) and/or other easily understandable interfaces for following a route. For example, some embodiments may overlay a route on camera data captured by the user device on a screen of the user device. Accordingly, a user may use the camera to image the environment and see the route within the environment. Some embodiments may provide at least the preceding features and/or others in a manner that is computationally efficient, for example by defining coordinate systems based on specific start and/or end points, allowing small data sets to fully explain and/or illustrate routes, as described in detail below.

Figure 1:
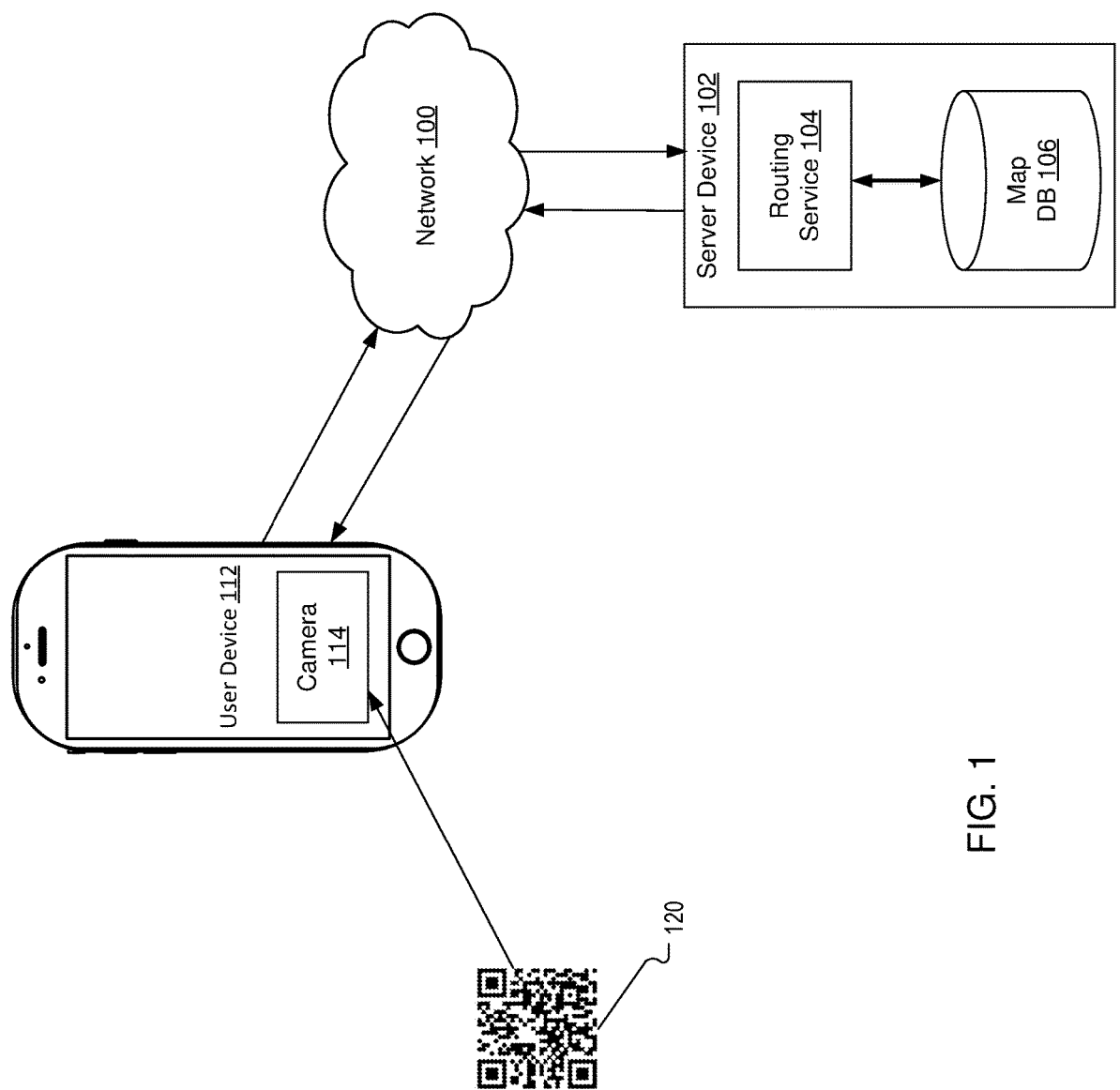
FIG. 1 shows a network according to an embodiment of the present disclosure.

FIG. 1 shows a network 100 according to an embodiment of the present disclosure. Server device 102 and user device 112 may communicate with one another through network 100. Network 100 may include the Internet and/or other public or private networks or combinations thereof.

In some embodiments, user device 112 may be any portable computing device, such as a smartphone, smart watch, tablet, laptop computer, or other device. User device 112 may include one or more sensors, such as camera 114 or other sensor(s). As described in greater detail below, user device 112 may be configured to display a user interface (UI) for presenting navigation information. In some embodiments, the navigation information may be augmented reality (AR) navigation information. For example, a user may hold user device 112 in such a way that a screen is facing the user and camera 114 is facing away from the user (e.g., in a direction of travel). Camera 114 may capture live image data of the environment and, as described in detail below, user device 112 may generate an AR overlay on the image data on the screen. The overlay may provide navigation instructions. In some embodiments, camera 114 may also be used to scan environmental features such as scannable code 120, labels, signs, etc., for example to trigger and/or record navigation data as described in detail below.

Server device 102 may include routing service 104 and map database 106. In some embodiments, user device 112 may communicate with routing service 104 to obtain routing data from map database 106 for display and/or to send routing data generated by user device 112 for storage in map database 106.

Server device 102 and user device 112 are each depicted as single devices for ease of illustration, but those of ordinary skill in the art will appreciate that server device 102 and/or user device 112 may be embodied in different forms for different implementations. For example, server device 102 may include a plurality of routing services 104 and/or map databases 106, may include a plurality of devices, and/or may be embodied in a single device or device cluster depending on embodiment. In another example, a plurality of user devices 112 may be connected to network 100 and/or may utilize routing data as described herein. A single user may have user devices 112, and/or there may be multiple users each having their own user device(s) 112. Furthermore, as noted above, network 100 may be a single network or a combination of networks, which may or may not all use similar communication protocols and/or techniques.

Figure 2:
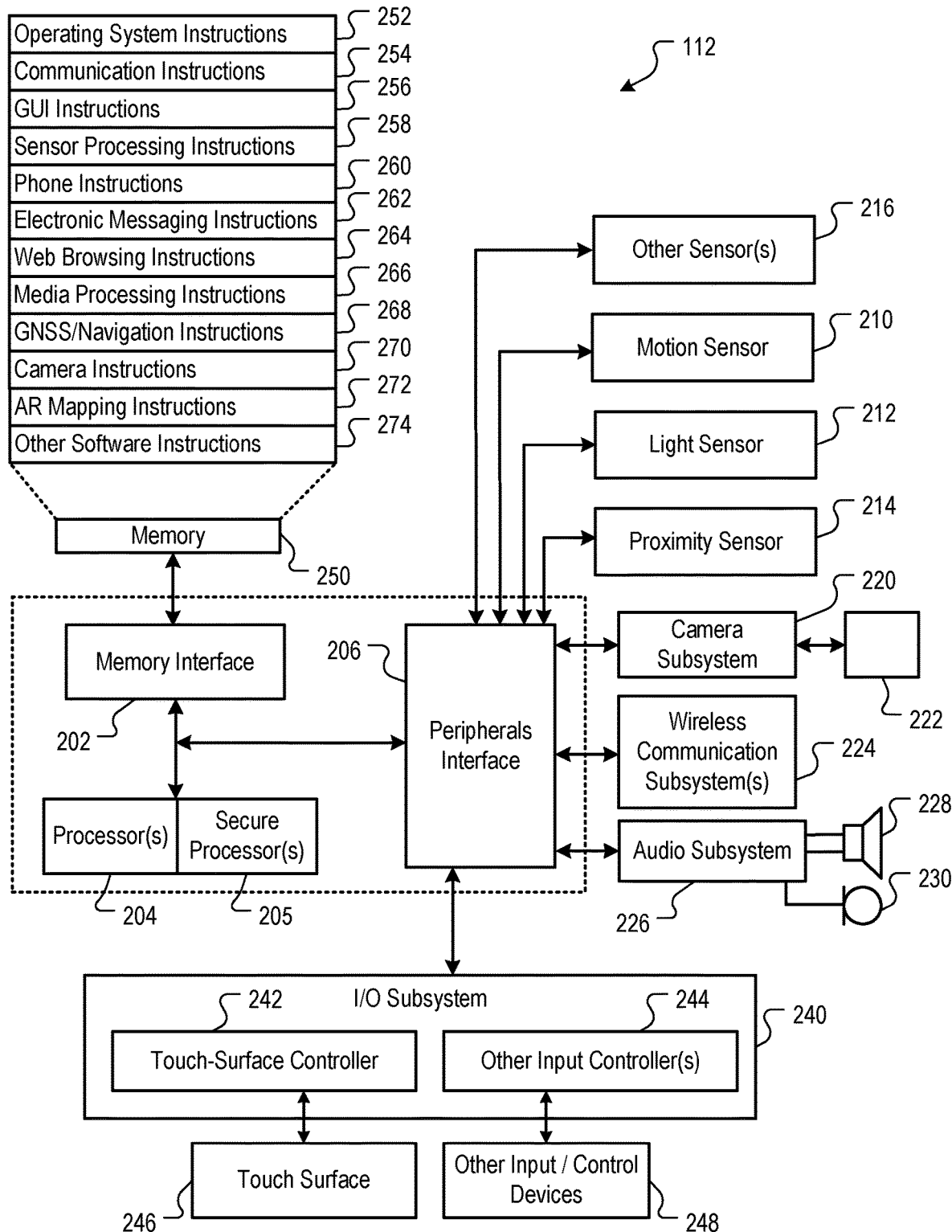
FIG. 2 shows a user device according to an embodiment of the present disclosure.

FIG. 2 shows a block diagram of an example computing device, for example a computing device configured to function as user device 112. The user device 112 may include a memory interface 202, one or more data processors, image processors, central processing units 204, and a peripherals interface 206. The memory interface 202, the one or more processors 204, and/or the peripherals interface 206 may be separate components or may be integrated in one or more integrated circuits. The various components in the user device 112 may be coupled by one or more communication buses or signal lines.

Sensors, devices, and subsystems may be coupled to the peripherals interface 206 to facilitate multiple functionalities. For example, a motion sensor 210, a light sensor 212, and a proximity sensor 214 may be coupled to the peripherals interface 206 to facilitate orientation, lighting, and proximity functions. Other sensors 216 may also be connected to the peripherals interface 206, such as a global navigation satellite system (GNSS) (e.g., GPS receiver), a temperature sensor, a biometric sensor, magnetometer, or other sensing device, to facilitate related functionalities.

A camera subsystem 220 and an optical sensor 222, e.g., a charged coupled device (CCD) or a complementary metal-oxide semiconductor (CMOS) optical sensor, may be utilized to facilitate camera functions, such as recording photographs and video clips. The camera subsystem 220 and the optical sensor 222 may be used to collect images of a user to be used during authentication of a user, e.g., by performing facial recognition analysis.

Communication functions may be facilitated through one or more wired and/or wireless communication subsystems 224, which can include radio frequency receivers and transmitters and/or optical (e.g., infrared) receivers and transmitters. For example, the Bluetooth (e.g., Bluteooth low energy (BTLE)) and/or WiFi communications described herein may be handled by wireless communication subsystems 224. The specific design and implementation of the communication subsystems 224 may depend on the communication network(s) over which the user device 112 is intended to operate. For example, the user device 112 may include communication subsystems 224 designed to operate over a GSM network, a GPRS network, an EDGE network, a WiFi or WiMax network, and a Bluetooth™ network. For example, the wireless communication subsystems 224 may include hosting protocols such that the device 120 can be configured as a base station for other wireless devices and/or to provide a WiFi service.

An audio subsystem 226 may be coupled to a speaker 228 and a microphone 230 to facilitate voice-enabled functions, such as speaker recognition, voice replication, digital recording, and telephony functions. The audio subsystem 226 may be configured to facilitate processing voice commands, voiceprinting, and voice authentication, for example.

The I/O subsystem 240 may include a touch-surface controller 242 and/or other input controller(s) 244. The touch-surface controller 242 may be coupled to a touch surface 246. The touch surface 246 and touch-surface controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 246.

The other input controller(s) 244 may be coupled to other input/control devices 248, such as one or more buttons, rocker switches, thumb-wheel, infrared port, USB port, and/or a pointer device such as a stylus. The one or more buttons (not shown) may include an up/down button for volume control of the speaker 228 and/or the microphone 230.

In some implementations, a pressing of the button for a first duration may disengage a lock of the touch surface 246; and a pressing of the button for a second duration that is longer than the first duration may turn power to the user device 112 on or off. Pressing the button for a third duration may activate a voice control, or voice command, module that enables the user to speak commands into the microphone 230 to cause the device to execute the spoken command. The user may customize a functionality of one or more of the buttons. The touch surface 246 can, for example, also be used to implement virtual or soft buttons and/or a keyboard.

In some implementations, the user device 112 may present recorded audio and/or video files, such as MP3, AAC, and MPEG files. In some implementations, the user device 112 may include the functionality of an MP3 player, such as an iPod™. The user device 112 may, therefore, include a 36-pin connector and/or 8-pin connector that is compatible with the iPod. Other input/output and control devices may also be used.

The memory interface 202 may be coupled to memory 250. The memory 250 may include high-speed random access memory and/or non-volatile memory, such as one or more magnetic disk storage devices, one or more optical storage devices, and/or flash memory (e.g., NAND, NOR). The memory 250 may store an operating system 252, such as Darwin, RTXC, LINUX, UNIX, OS X, WINDOWS, or an embedded operating system such as VxWorks.

The operating system 252 may include instructions for handling basic system services and for performing hardware dependent tasks. In some implementations, the operating system 252 may be a kernel (e.g., UNIX kernel). In some implementations, the operating system 252 may include instructions for performing voice authentication.

The memory 250 may also store communication instructions 254 to facilitate communicating with one or more additional devices, one or more computers and/or one or more servers. The memory 250 may include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GNSS/Navigation instructions 268 to facilitate GNSS and navigation-related processes and instructions; and/or camera instructions 270 to facilitate camera-related processes and functions.

The memory 250 may store mapping instructions 272 to facilitate other processes and functions, such as the route generation and/or display functions described herein.

The memory 250 may also store other software instructions 274, such as web video instructions to facilitate web video-related processes and functions; and/or web shopping instructions to facilitate web shopping-related processes and functions. In some implementations, the media processing instructions 266 may be divided into audio processing instructions and video processing instructions to facilitate audio processing-related processes and functions and video processing-related processes and functions, respectively.

Each of the above identified instructions and applications may correspond to a set of instructions for performing one or more functions described herein. These instructions need not be implemented as separate software programs, procedures, or modules. The memory 250 may include additional instructions or fewer instructions. Furthermore, various functions of the user device 112 may be implemented in hardware and/or in software, including in one or more signal processing and/or application specific integrated circuits.

Figure 3:
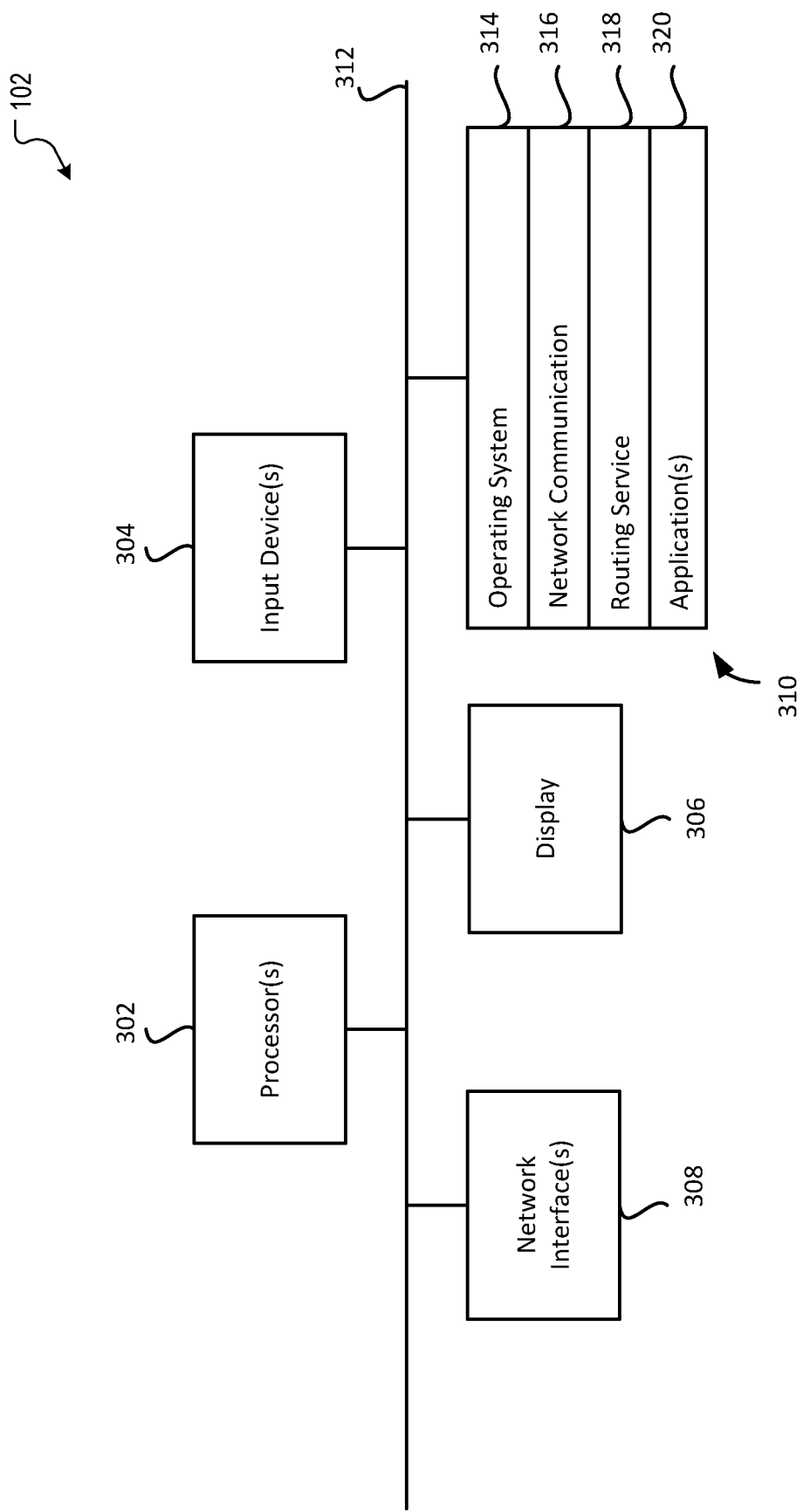
FIG. 3 shows a server device according to an embodiment of the present disclosure.

FIG. 3 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 314 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/O controller; and managing traffic on bus 312. Network communications instructions 316 may establish and maintain network connections (e.g., software for implementing communication protocols, such as TCP/IP, HTTP, Ethernet, telephony, etc.).

Routing service instructions 318 may include instructions that receive, store, identify, and/or send routing data as described herein. Application(s) 320 may be an application that uses or implements the processes described herein and/or other processes. The processes may also be implemented in operating system 314.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 4A:
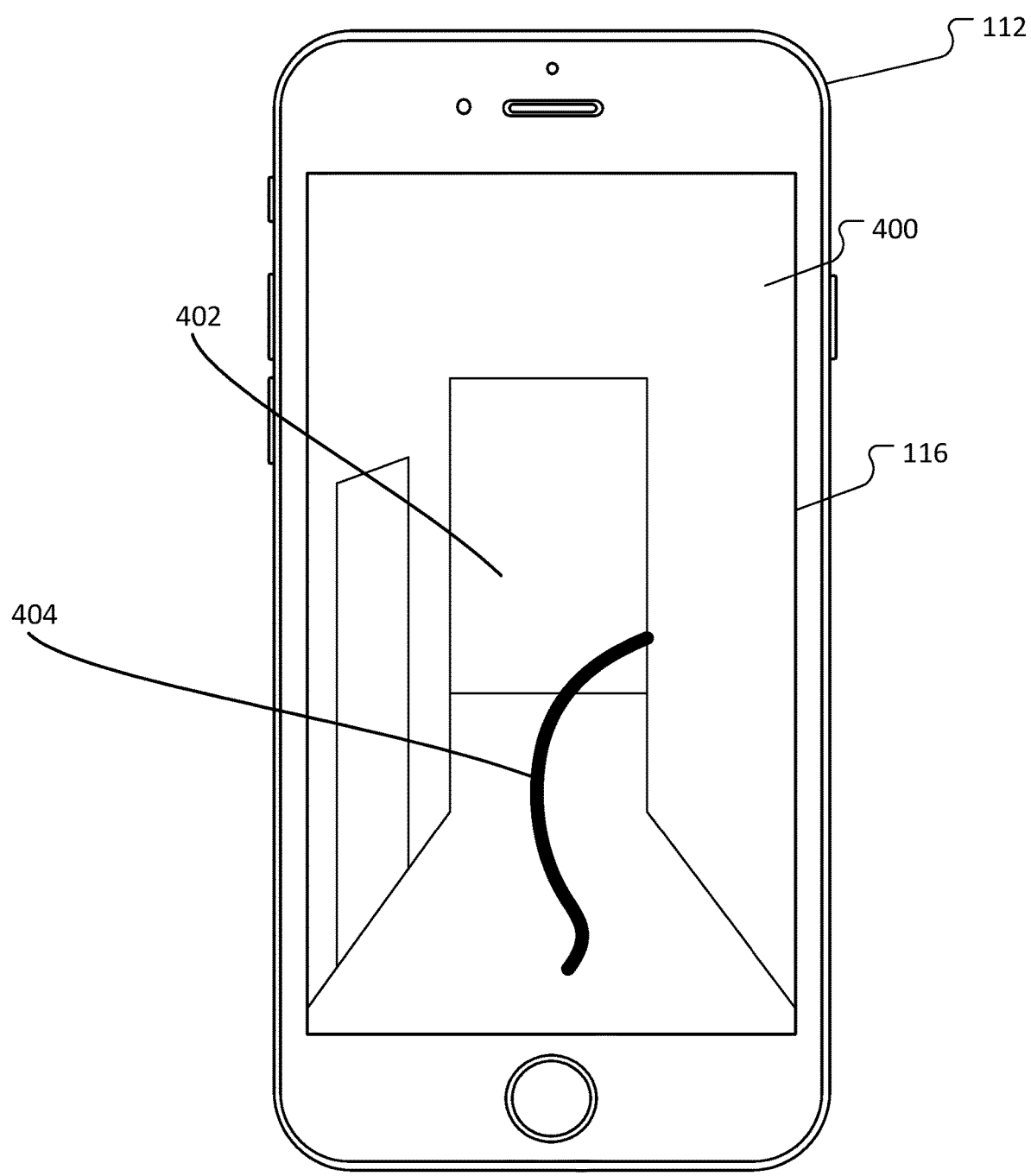
FIGS. 4A-4B show an augmented reality navigation user interface according to an embodiment of the present disclosure.
Figure 4B:
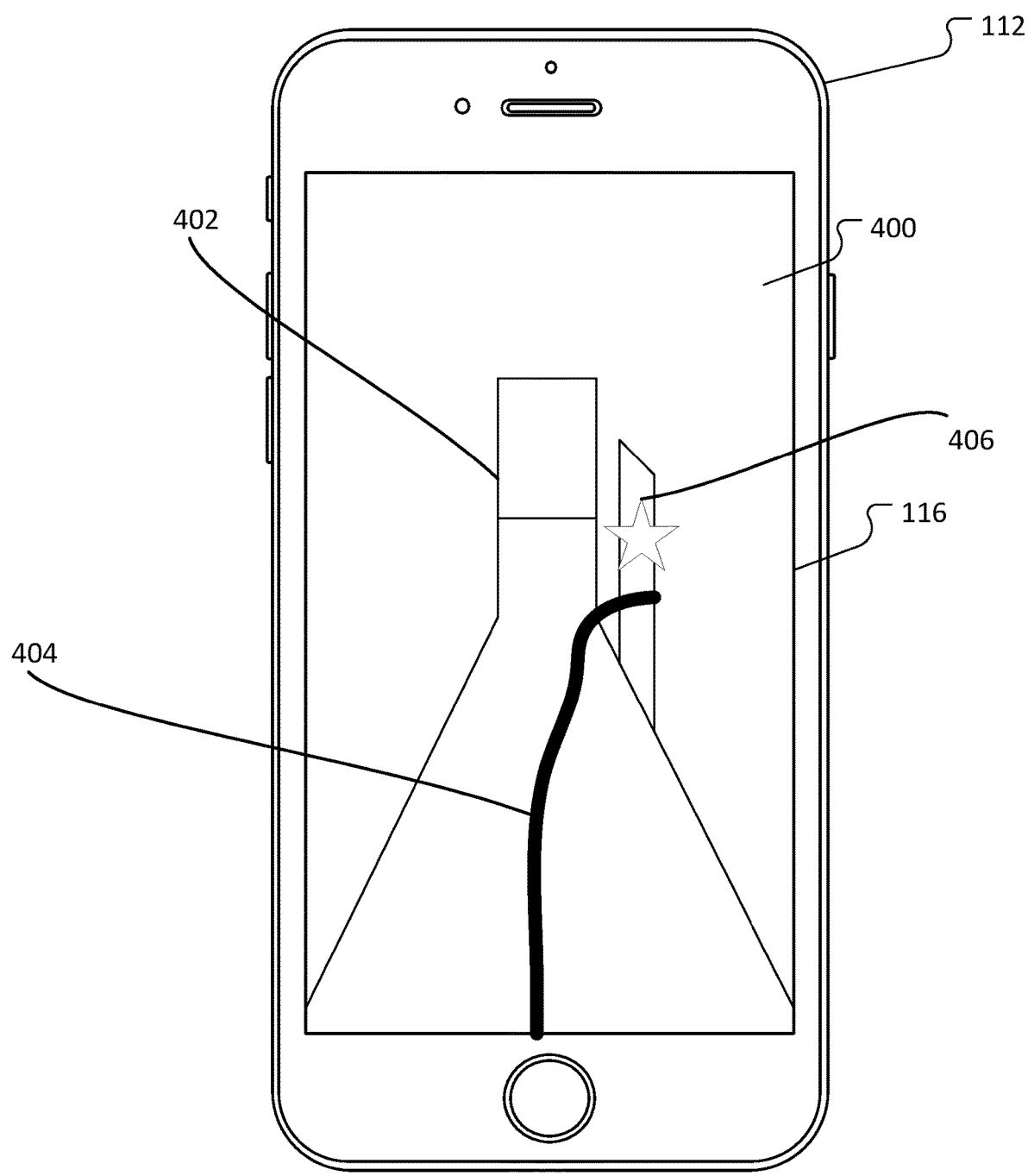

FIGS. 4A-4B show an AR navigation UI 400 according to an embodiment of the present disclosure. AR navigation UI 400 may be generated by user device 112 and displayed on screen 116 of user device 112 (e.g., which may be a touch surface 246 or any other type of screen). In some embodiments, user device 112 may perform processing such as that described below with respect to FIGS. 7A-7B and/or 9 to generate AR navigation UI 400.

AR navigation UI 400 may include an environmental scene 402. For example, environmental scene 402 may include image data captured by camera 114. In some embodiments, camera 114 may be arranged to face a direction opposite the direction screen 116 faces. Camera 114 may capture images of a scene directly behind screen 116, and when these images are displayed on screen 116, they may represent the environment directly behind screen 116. Accordingly, from the point of view of a user looking at screen 116, screen 116 may project an image of the portion of the environment that the user is facing. For example, as shown in FIG. 4A, environmental scene 402 shows a hallway with a door to the left and a T-intersection directly ahead. This may be what is ahead of the user. As user device 112 moves through the environment, environmental scene 402 may change, as illustrated in FIG. 4B which shows a door to the right and a different T intersection ahead.

In some embodiments, AR navigation UI 400 may also include a path 404. Path 404 may be a graphical element generated by user device 112. For example, as described in greater detail below, user device 112 may obtain data including coordinates (e.g., relative to a navigation starting point) marking a path from the starting point to a destination 406. User device 112 may draw path 404 along the coordinates, which may illustrate a path to follow to destination 406 within environmental scene 402. Destination 406 may be marked in AR navigation UI 400 when it is in view. In some embodiments, user device 112 may identify the starting point through data captured by one or more sensors (e.g., camera 114 or GPS sensor), as described in detail below.

Figure 5:
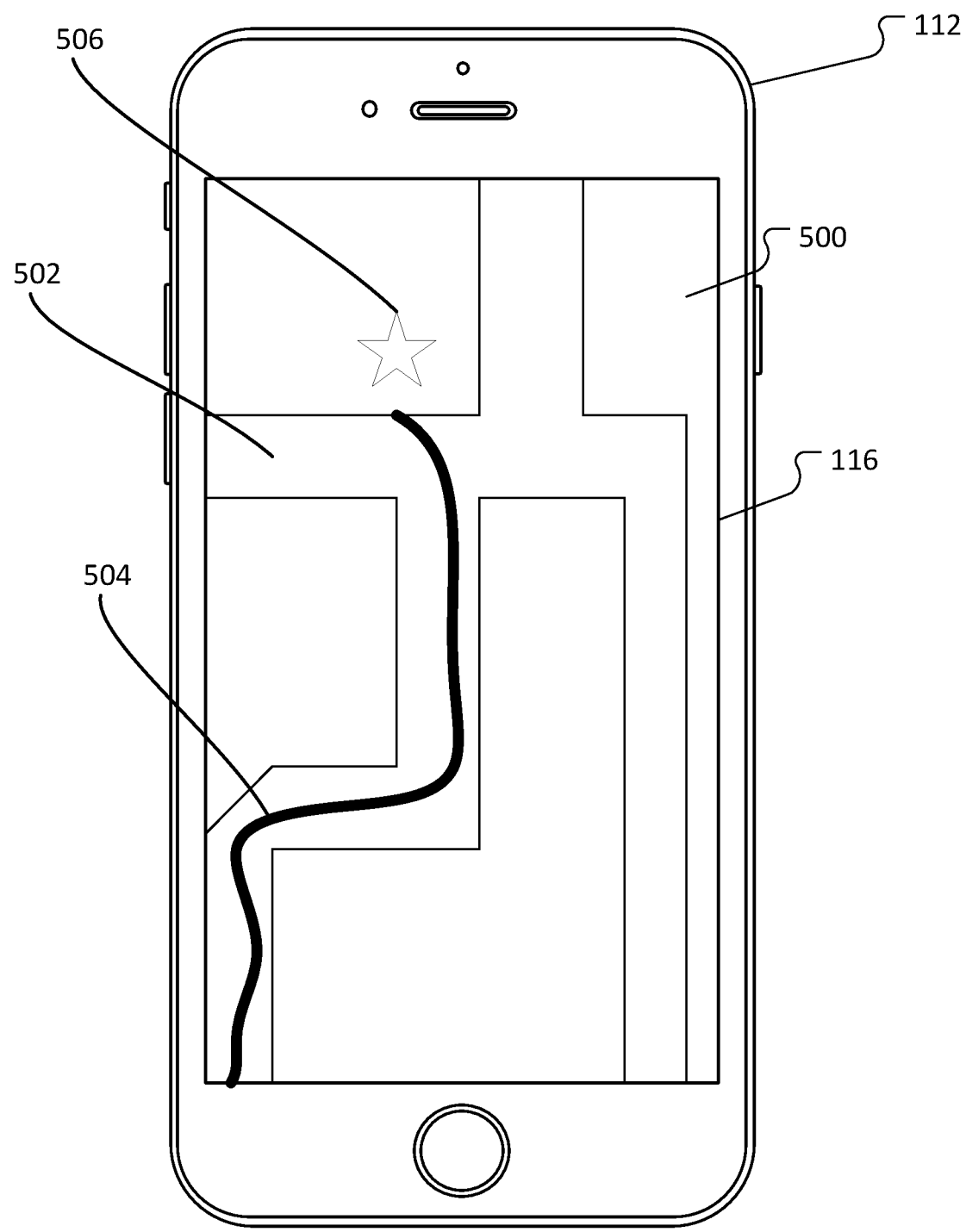
FIG. 5 shows a user interface including a map according to an embodiment of the present disclosure.

FIG. 5 shows a navigation UI 500 including a map 502 according to an embodiment of the present disclosure. As demonstrated by the example of FIG. 5, similar data and/or processing that is used to generate the AR navigation UI 400 may be used to generate non-AR interfaces in some embodiments. For example, navigation UI 500 may display path 504 and/or destination 506 overlaid on map 502. Path 504 and/or destination 506 may be determined similarly to those shown in AR navigation UI 400, but instead of being overlaid on an environmental scene 402, they may be overlaid onto a graphic not including camera data. In the example of FIG. 5, the graphic is map 502, but other embodiments may use other graphics, such as 3D renderings of environmental scenes or the like. User device 112 may draw path 504 along the coordinates, which may illustrate a path to follow to destination 506 within map 502. In some embodiments, user device 112 may identify the starting point through data captured by one or more sensors (e.g., camera 114 or GPS sensor).

Figure 6:
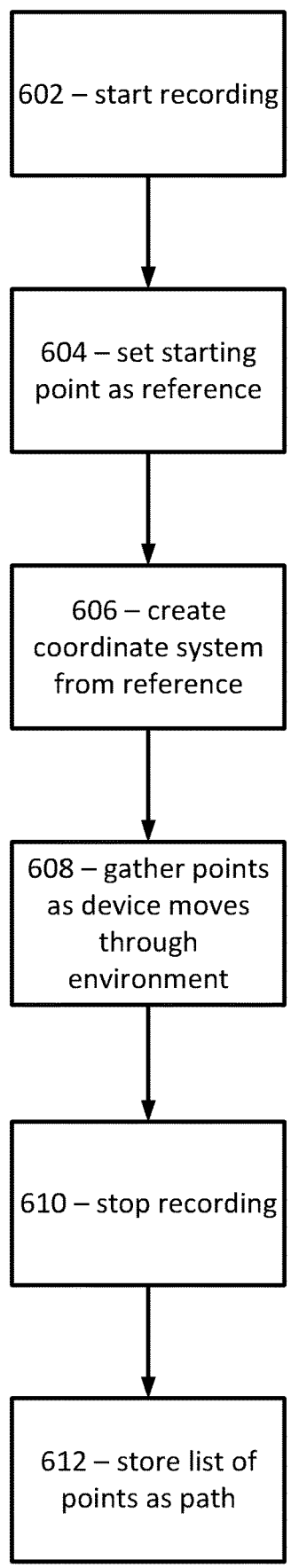
FIG. 6 shows a route creation process according to an embodiment of the present disclosure.

FIG. 6 shows a route creation process 600 according to an embodiment of the present disclosure. User device 112 may perform process 600 to create routes from starting points to destinations. For example, process 600 may enable route creation without constructing 3D geometries of the environment, even within areas having multiple floors. The result may be a compact data set that may be used for future routing processing (e.g., according to processes 700-900 described below).

At 602, user device 112 may start process 600, for example by receiving a user command to start recording the route. In some embodiments, user device 112 may present a UI providing instructions for recording the route to a user. For example, the UI may instruct the user on an orientation at which user device 112 should be held for best results (e.g., upright so that the camera is facing a direction roughly parallel to a floor surface) and/or may provide other instructions.

At 604, user device 112 may set a starting point of the route as a reference. For example, user device 112 may include one or more sensors (e.g., camera 114, gyroscope, accelerometer, or a combination thereof). User device 112 may be configured to determine its spatial orientation from sensor data (e.g., using ARKit™, ARCore™, or other processing options). In some embodiments, user device 112 may use an initial camera 114 view at the time recording starts to mark the starting point. In some embodiments, the user may scan a scannable code 120 in the environment to mark the starting point, or may scan a sign (e.g., a label on or near a particular door or other location in an interior environment) to mark the starting point.

At 606, user device 112 may create a coordinate system based on the starting point reference. For example, user device 112 may express its spatial orientation in (x, y, z) coordinates. User device 112 may set the starting point as (0, 0, 0).

At 608, user device 112 may gather coordinate data as user device 112 moves through the environment. For example, based on measurements from the one or more sensors, user device 112 may detect its own movement (e.g., as a user walks from the starting point towards their destination to which they are mapping). Based on the movement, user device 112 may detect its own position within the coordinate system. User device 112 may repeatedly record its position as a new point within the path. For example, user device 112 may record a new point at periodic time intervals and/or after traveling a predetermined distance through the coordinate system. Over time, user device 112 may record several points that may together define a path describing the movement of user device 112 through the environment.

At 610, user device 112 may stop recording points. For example, the user may issue a command to stop recording points due to having reached the destination and/or due to the user making a detour they do not wish to record. In the latter case, the user may be able to issue a command to resume recording when user device 112 is at or near the point within the coordinate system where recording was stopped. In this case, process 600 may resume at 608. If the user indicates the destination is reached, process 600 may continue to 612.

At 612, user device 112 may store a list of the (x, y, z) coordinates recorded at 608 as points on a path from the starting point to the destination. For example, user device 112 may store the list in local memory. In some embodiments, user device 112 may alternatively and/or additionally send the list to server device 102 by network 100. Routing service 104 may store the points in map database 106, as described below in process 800, for example.

Figure 7:
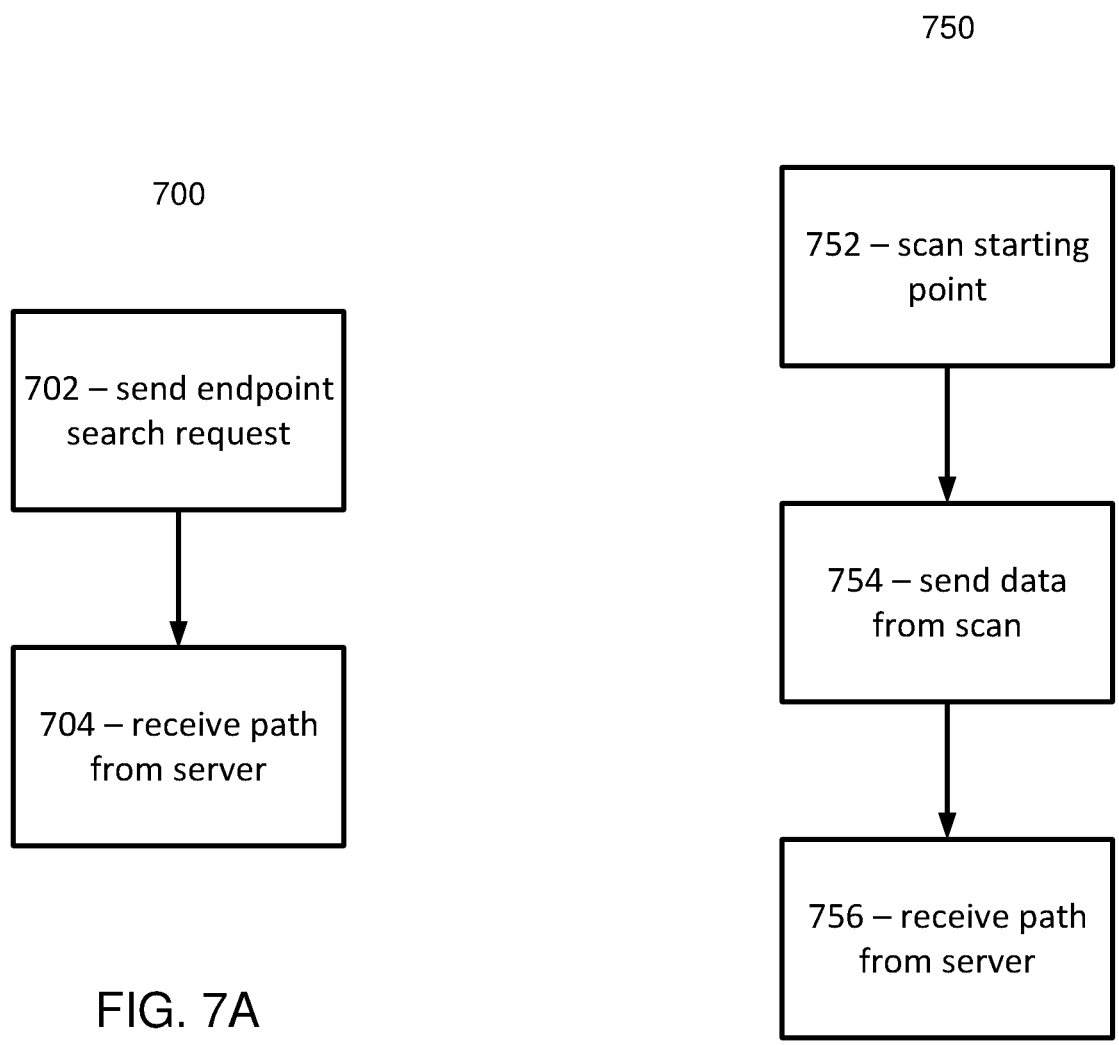
FIGS. 7A-7B show route loading processes according to an embodiment of the present disclosure.

FIGS. 7A-7B show route loading processes 700 and 750 according to an embodiment of the present disclosure. User device 112 may perform one or more of the route loading processes 700 and 750 in order to display routes (e.g., in UI 400 or UI 500). Note that in some embodiments, user device 112 may also be able to retrieve locally stored routes (e.g., as generated by process 600 on the same user device 112) for display.

In process 700, user device 112 may locate a route for display based on a search. For example, the user may be able to specify search terms such as a starting point and/or destination and see available routes.

At 702, user device 112 may generate and/or send an endpoint search request. For example, a user may enter search terms into a UI of user device 112. Search terms may include a starting point, a destination, or a combination thereof. In some embodiments, user device 112 may send the search terms to server device 102.

At 704, user device 112 may receive one or more results from server device 102 in response to the request (e.g., generated by process 800 described below). For example, if the request included both a starting point and a destination, the response may include a path between the starting point and the destination or an indication that no such path is available (e.g., which may include alternative suggestions for routes associated with at least one of the starting point and the destination). If the request included one of a starting point and a destination, the response may include one or more available routes associated with the starting point and/or the destination. If available routes are returned, the user may be able to select a route, which may cause user device 112 to request the selected route from server device 102 and receive the path for the route from server device 102 in response.

In process 750, the user may scan an environmental feature such as scannable code 120 or a landmark, sign, etc. with camera 114, which may trigger retrieval of a specific path associated with the feature.

At 752, user device 112 may scan an environmental feature indicating a starting point with camera 114. For example, a scannable code 120 may be positioned in the environment to indicate there is a path available. In another example, the user may capture an image with camera 114 and use the image as a search term to see whether there are routes starting from the imaged location.

At 754, user device 112 may send the data from the scan to server device 102. The scannable code 120 may automatically trigger sending the data requesting the specific path associated with scannable code 120 upon scanning in some embodiments.

At 756, user device 112 may receive a response from server device 102 providing the path requested at 754. The response may include the specific path associated with scannable code 120. If the data sent was not a scannable code, the response may include one or more available routes associated with the imaged location and/or an indication that no routes are available. If available routes are returned, the user may be able to select a route, which may cause user device 112 to request the selected route from server device 102 and receive the path for the route from server device 102 in response. In some embodiments, if no routes are available, a UI of user device 112 may provide an option to record a route. If this option is selected, user device 112 may perform process 600 as described above.

Figure 8:
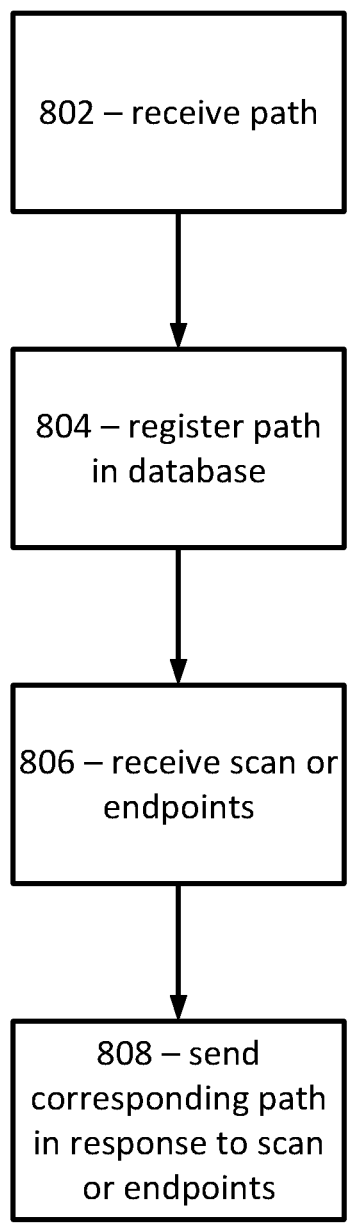
FIG. 8 shows a route server process according to an embodiment of the present disclosure.

FIG. 8 shows a route server process 800 according to an embodiment of the present disclosure. Server device 102 may perform process 800 in response to actions by user device 112 in processes 600, 700, and/or 750 described above.

At 802, server device 102 may receive a newly recorded path from user device 112. For example, as noted above, user device 112 may send a list generated through process 600 or some other process to server device 102 by network 100.

At 804, server device 102 may register the path received at 802 in map database 106. For example, routing service 104 may store the points in map database 106. Routing service 104 may also store information describing the points, such as a starting point, a destination, a user ID from which the route was received, a description, etc. Routing service 104 may store many such paths within map database 106 and/or may store predefined paths not recorded by users of user devices 112. The predefined paths may have a similar format to paths defined according to process 600 (e.g., with coordinate systems based on starting points).

At 806, server device 102 may receive a request for a path from a user device 112. For example, as described above, the request may include data generated by scanning scannable code 120, data generated by imaging the environment, and/or search request data entered through a UI.

At 808, server device 102 may examine the data received at 806 and identify one or more paths to send or suggest to user device 112. For example, in a case where the request identifies a single path in map database 106 (e.g., code scan or start/end search request), routing service 104 may retrieve and send the identified path. In a case where the request suggests multiple paths in map database 106, routing service 104 may send information describing the paths, receive a selection of one path from user device 112, and retrieve and send the selected path. If no paths matching the request are available in map database 106, routing service 104 may send an error message.

Figure 9:
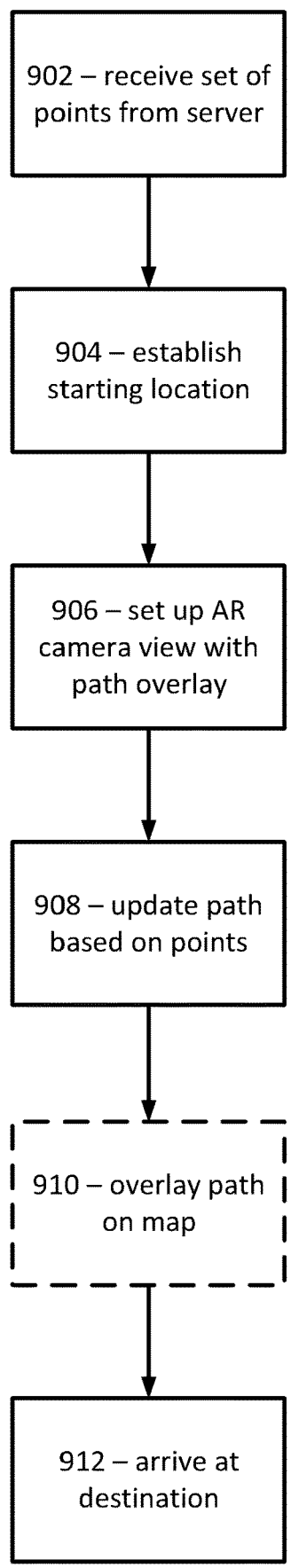
FIG. 9 shows an augmented reality navigation user interface display process according to an embodiment of the present disclosure.

FIG. 9 shows an augmented reality navigation user interface display process 900 according to an embodiment of the present disclosure. For example, user device 112 may perform process 900 to display a path in UI 400 and/or 500.

At 902, user device 112 may receive a set of points defining a path. A path may be defined by a set of (x, y, z) coordinates, and user device 112 may receive a set of coordinates from local memory or, as described above, from server device 102.

At 904, user device 112 may establish a starting location for the path. For example, in the case where the user scanned scannable code 120 to get points at 902, user device 112 may automatically establish its current location as point (0, 0, 0) in the coordinate system under the assumption that user device 112 is approximately in the starting location due to being where scannable code 120 is positioned. In some cases (e.g., when a starting location is provided in a search), user device 112 may request and receive user confirmation through a UI that user device 112 is in the correct starting location. Upon receiving the confirmation, user device 112 may establish its current location as point (0, 0, 0) in the coordinate system.

At 906, user device 112 may generate AR navigation UI 400, which may include environmental scene 402, path 404, and, in some views, destination 406, as described above. For example, user device 112 may display environmental scene 402 as captured by camera 114 and may render path 404 over environmental scene 402 using Unity™ or another 3D animation method. Note that because the current location is the starting point, user device 112 may be able to render path 404 independently of GPS or other location sensing features, allowing different paths 404 to be displayed on different floors of a building or the like.

At 908, user device 112 may update path 404 as user device 112 moves through the environment. For example, based on measurements from the one or more sensors, user device 112 may detect its own movement (e.g., as a user walks from the starting point towards their destination to which they are mapping). Based on the movement, user device 112 may detect its own position within the coordinate system. User device 112 may render nearby points in the coordinate system as path 404 within environmental scene 402 based on their relative positions to user device 112 within the coordinate system. Accordingly, as environmental scene 402 changes, path 404 may change to correspond to the recorded locations for the navigation instructions.

As noted above, in some embodiments, user device 112 may be configured to generate non-AR UIs (e.g., UI 500). In some embodiments, at 910, user device 112 may overlay path 504 on map 502 or generate some other non-AR interface. For example, user device 112 may establish a zero point in the coordinate system within a graphic display of map 502 and overlay path 504 onto map 502 at points corresponding to the coordinate system. In some embodiments, the user may be able to switch between AR navigation UI 400 and navigation UI 500 by making selections through the respective UIs 400 and 500.

Returning to the AR rendering, at 912, user device 112 may arrive at or near destination 406. As shown in FIG. 4B, destination 406 may be specifically indicated in AR navigation UI 400 at its location within the coordinate system. In some embodiments, when user device 112 arrives at or near destination 406, display of path 402 may end, in some embodiments accompanied by a message indicating that destination 406 has been reached. In other embodiments, the message indicating that destination 406 has been reached, but user device 112 may continue to display path 402 until a user exits AR navigation UI 400.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of providing an augmented reality (AR) display comprising:
   receiving, at a processor of an AR device, an image captured by a camera of the AR device;
   determining, by the processor, that the AR device is at a starting location by analyzing the image and determining that a plurality of navigation destinations are available from the starting location;
   receiving, by the processor, a user selection of one of the plurality of navigation destinations as a selected navigation destination;
   receiving, at the processor, a plurality of points within a coordinate system corresponding to points in space, the plurality of points defining a path between the starting location within the coordinate system and the selected navigation destination within the coordinate system;
   receiving, at the processor, camera data from the camera of the AR device, the camera data representing at least a portion of the points in space;
   generating, by the processor, an AR display, the generating comprising overlaying a graphic illustrating the position of the portion of the points within the coordinate system that are represented in the camera data over all equivalent points in space illustrated by the camera data to form a path over the camera data;
   receiving, at the processor, updated camera data from the camera of the AR device, the updated camera data representing at least a partially different portion of the points in space as a result of the camera having moved through space; and
   generating, by the processor, an updated AR display, the generating comprising overlaying an updated graphic illustrating the position of the partially different portion of the points within the coordinate system that are represented in the updated camera data over all equivalent points in space illustrated by the updated camera data to update the path over the updated camera data.

2. The method of claim 1, wherein the determining that the AR device is at the starting location further comprises:
   gathering location data defining a position of the AR device with at least one sensor of the AR device; and
   comparing the location data with location data defining the starting location.

3. The method of claim 1, wherein the generating comprises changing the graphic to illustrate the position of a different portion of the points within the coordinate system as the AR device moves along equivalent different points in space illustrated by the camera data.

4. The method of claim 1, further comprising generating, by the processor, a map display illustrating the points within the coordinate system overlaid on a map.

5. A method of generating augmented reality (AR) display data comprising:
   setting, by a processor of an AR device, a location of the AR device as a starting location within a coordinate system corresponding to points in space;
   as the AR device moves through space from the starting location, repeatedly recording, by the processor, locations of the AR device as points within the coordinate system;
   determining, by the processor, that the AR device has reached a destination location within the coordinate system;
   in response to the determining, generating, by the processor, a route definition comprising at least the starting location within the coordinate system, the points within the coordinate system, and the destination location within the coordinate system;
   associating, by the processor, with the starting location as a user-selectable route of a plurality of user-selectable routes originating at the starting location and having different destination locations; and
   in response to a user selection of the user-selectable route made in response to a determination that the AR device is at the starting location, generating, by the processor, an AR display, the generating comprising:
      receiving, at the processor, camera data from a camera of the AR device, the camera data representing at least a portion of the points in space;
      overlaying a graphic illustrating the position of the portion of the points within the coordinate system that are represented in the camera data over all equivalent points in space illustrated by the camera data to form a path over the camera data;
      receiving, at the processor, updated camera data from the camera of the AR device, the updated camera data representing at least a partially different portion of the points in space as a result of the camera having moved through space; and overlaying an updated graphic illustrating the position of the partially different portion of the points within the coordinate system that are represented in the updated camera data over all equivalent points in space illustrated by the updated camera data to update the path over the updated camera data.

6. The method of claim 5, wherein the setting of the location as the starting location comprises receiving a scan of an object at the starting location.

7. The method of claim 5, further comprising transmitting, by the processor, the route definition to a server configured to serve AR display data.

8. The method of claim 5, wherein the determining that the AR device has reached a destination location is performed in response to a user command.

9. The method of claim 5, wherein the determining that the AR device has reached a destination location is performed in response to receiving a scan of an object at the destination location.

10. An augmented reality (AR) device comprising:
a processor;
a camera in communication with the processor;
a display in communication with the processor; and
a non-transitory memory in communication with the processor, the non-transitory memory storing instructions that, when executed by the processor, cause the processor to perform processing comprising:
receiving an image captured by a camera of the AR device;
determining that the AR device is at a starting location by analyzing the image and determining that a plurality of navigation destinations are available from the starting location;
receiving a user selection of one of the plurality of navigation destinations as a selected navigation destination;
receiving a plurality of points within a coordinate system corresponding to points in space, the plurality of points defining a path between the starting location within the coordinate system and the selected navigation destination within the coordinate system;
receiving, by the camera, camera data representing at least a portion of the points in space;
displaying, by the display, an overlay of a graphic illustrating the position of the portion of the points within the coordinate system that are represented in the camera data over all equivalent points in space illustrated by the camera data to form a path over the camera data;
receiving, by the camera, updated camera data representing at least a partially different portion of the points in space as a result of the camera having moved through space; and
displaying, by the display, an updated overlay of an updated graphic illustrating the position of the partially different portion of the points within the coordinate system that are represented in the updated camera data over all equivalent points in space illustrated by the updated camera data to update the path over the updated camera data.

11. The AR device of claim 10, wherein the processing further comprises:
setting a location of the AR device as the starting location within the coordinate system;
as the AR device moves through space from the starting location, repeatedly recording locations of the AR device as points within the coordinate system;
determining that the AR device has reached the destination location within the coordinate system; and
in response to the determining, generating a route definition comprising at least the starting location within the coordinate system, the points within the coordinate system, and the destination location within the coordinate system.

12. The AR device of claim 11, wherein the received plurality of points comprises the route definition.

13. The AR device of claim 11, further comprising a transceiver configured to transmit the route definition to a server configured to serve AR display data.

14. The AR device of claim 10, further comprising at least one location sensor configured to determine the AR device is at the starting location.

15. The AR device of claim 10, further comprising a transceiver configured to receive the plurality of points from a server configured to serve AR display data.

16. The AR device of claim 10, wherein the displaying comprises changing the graphic to illustrate the position of a different portion of the points within the coordinate system as the AR device moves along equivalent different points in space illustrated by the camera data.

17. The AR device of claim 10, wherein the processing further comprises displaying, by the display, a map display illustrating the points within the coordinate system overlaid on a map.

* * * * *